United States Patent
Koelsch (10) Patent No.: US 8,935,933 B1
(45) Date of Patent: Jan. 20, 2015

(54) BATTERY OPERATED TRANSFER REFRIGERATION UNIT

(76) Inventor: Ronald Koelsch, Roscommon, MI (US)

(*) Notice: Subject to any disclaimer, the term of this patent is extended or adjusted under 35 U.S.C. 154(b) by 271 days.

(21) Appl. No.: 13/548,249

(22) Filed: Jul. 13, 2012

Related U.S. Application Data (60) Provisional application No. 61/572,357, filed on Jul. 14, 2011.

(51) Int. Cl.
*F25B 1/00* (2006.01)

(52) U.S. Cl.
USPC ............................................. 62/115; 62/241

(58) Field of Classification Search
CPC ........ B60H 1/00428; B60H 1/00; B60H 3/00; B61D 27/00
USPC ........ 62/241, 242, 239, 237, 215, 134, 323.3, 62/115; 123/41.11, 41.66; 180/65.265, 180/53.1
See application file for complete search history.

(56) References Cited

U.S. PATENT DOCUMENTS

| | | | | |
|---|---|---|---|---|
| 2,352,379 A * | 6/1944 | Geertz | ............................ | 169/24 |
| 2,981,076 A * | 4/1961 | Gaugler et al. | ................. | 62/208 |
| 3,010,289 A * | 11/1961 | Kuklinski | ..................... | 62/196.1 |
| 3,218,821 A * | 11/1965 | Spatt | ............................... | 62/244 |
| 4,021,214 A * | 5/1977 | Bush | ............................... | 62/244 |
| 4,922,727 A * | 5/1990 | Viegas | .......................... | 62/239 |
| 5,129,235 A * | 7/1992 | Renken et al. | .................. | 62/200 |
| 5,144,814 A * | 9/1992 | Gaudette | ........................ | 62/225 |
| 6,227,002 B1 * | 5/2001 | Bianco et al. | ................... | 62/302 |
| 7,481,072 B2 * | 1/2009 | Ostrom et al. | .................. | 62/243 |
| 2006/0237247 A1 * | 10/2006 | Severinsky et al. | .......... | 180/65.4 |
| 2007/0144192 A1 * | 6/2007 | Kidwell | ......................... | 62/209 |
| 2008/0170914 A1 * | 7/2008 | Rutherford | ..................... | 406/42 |

* cited by examiner

*Primary Examiner* — Mohammad M Ali (57) ABSTRACT

Battery powered transport refrigeration assembly for semi-trailers. The assembly relates to large-vehicle refrigeration systems (reefers) and more particularly to semi-truck reefers.

15 Claims, 7 Drawing Sheets

BATTERY OPERATED TRANSFER REFRIGERATION UNIT

This application claims priority from U.S. Provisional application 61/572,357, filed Jul. 14, 2011.

BACKGROUND OF THE INVENTION

The present invention relates to large-vehicle refrigeration systems (reefers) and more particularly to semi-truck reefers.

The prior art systems employ internal combustion engines to directly drive the compressor and other components of the reefer. Modern electrical reefer systems use an internal combustion engine to run a generator that produces alternating current (ac) power to drive an ac motor and other ac components.

While the apparatii of the prior art fulfills their particular objectives they do not eliminate carbon exhaust emissions. Some of these designs simply store electric energy to be used at some later time. Others use a combination of an ac electric motor and a diesel engine that emits carbon exhaust emissions. Therefore they do not meet idle restriction limits or emissions standards. These units are based on ac power and are not readily adaptable to battery power and emissions free operation.

It completely eliminates particulate and carbon exhaust emissions from these reefers especially during the critical phases of food transport, loading and unloading. This invention uses a battery powered direct-current (dc) electric motor instead of an internal combustion engine, thus providing for the first time a self-contained, all electric semi-trailer reefer system that is economical to operate and simple to manufacture. It also meets the rigorous demands of the trucking industry and environmental idle and emissions mandates.

In order to use a battery to power one of these ac systems the dc battery power must be continually inverted to single phase ac power thus wasting critical battery power and introducing reliability issues. This single phase power does not work well because the inrush current is too high with a single phase ac motor. So the ac power from the inverter must be converted to 3 phase using a variable frequency drive to run a 3 phase ac electric motor. This wastes battery power and adds expense. Also the generator power of an ac system must be inverted to dc power to charge a battery. These multiple power inversions are expensive, require additional maintenance, waste battery power and are not economically feasible. This has been a limiting factor in designing a production worthy all electric system prior to this invention.

Generator/alternator systems that are AC based, must use constant generator-rotational speed configurations to match the 60 cycle frequency requirements of an ac motor. This is done mechanically with transmissions and hydraulically with constant speed pumps. These configurations are expensive, maintenance heavy and unreliable making them ill suited to reefer applications.

The reefer dc electric motor of this invention is driven by simple dc power from the battery and generator combination and is not prone to the issue of variable generator rpm and the associated frequency fluctuations of an ac generator output. These issues and power loses are eliminated by the all dc power design of this invention.

An object of the invention is to provide a high-performance power system that routinely generates and uses dc-only power at or in excess of 18 Kw. Reliability issues occur with the constant on and off switching of the high power that drives the heavy duty electric motor. Electrical spiking and thermal over-temperature conditions occur frequently, which require special circuit designs and protection.

This is especially true of the ac electric and diesel system since it must constantly switch between electric and diesel power. Existing power management techniques have failed to take this into account which is another major reason why an all electric semi-trailer reefer system has not been successfully designed to date.

The simple dc power control system of this invention avoids these reliability issues. Some of the prior art apparatii use a separate axle to drive the generator such as a third axle. Typically this axle must have a control system that lifts the wheels off the road surface when the generator is not being used, or when a tight turn is made, or when backing up. These axles are very undesirable because they modify the trailer suspension system. Safety rules are violated and road worthiness is degraded. Separate axle configurations produce abnormal tire wear from side load scuffing and abrupt wheel rotation when lowered to the road surface.

This invention eliminates these issues by driving the generator with an axle and differential mounted to the standard trailer suspension.

The prior art devices lack the features necessary to physically replace the reefer internal combustion engine, which is usually diesel.

This invention makes possible for the first time the fabrication or retrofit of a semi-trailer reefer system that is all electric and completely self contained. Self contained in the sense that this reefer trailer system has within itself all the components needed to refrigerate during all phases of food transport and delivery independent of the tractor.

A unique combination of high-power generator, compressor, heavy-duty axle/differential, batteries and direct current power control and motor system achieve the cooling capacity necessary and sufficient for the refrigeration trucking industry.

If more refrigeration capacity is needed during the battery power-only phase of operation cold air containment curtains and/or eutectic plates are added to the all electric reefer system. Air containment curtains are track operated at the semi-trailer delivery door to allow easy ingress and egress while reducing the escape of refrigerated air to the outside atmosphere. Eutectic plates store cooling capacity generated during road or line power reefer operation in a eutectic solution contained by plates that can be part of the reefer evaporator section.

A small portable auxiliary battery may be used to provide emergency power. This extra cooling capacity is then available during the critical power limited phase of operation when the all electric reefer system is stationary and no additional power is supplied to the battery.

The generator cannot be mounted in the semi-tractor engine compartment. One-piece trucks can use a smaller generator mounted to the truck engine to run the smaller reefer unit and charge the batteries. This does not work for a semi-tractor/trailer combination because the logistics of mixing and matching tractors with trailers are too restrictive during normal operations. Therefore a semi-trailer specific generator is required. This invention makes use of the semi-trailer motion to drive an electric generator.

It is a matter of converting the translational vehicle momentum to rotational momentum. The electric generator is programmed to not produce electricity during any acceleration phase thus, it never puts a load on the semi-tractor engine during acceleration of the vehicle. A semi-trailer is but one example. Generally this power generation system can be applied to any vehicle in motion where there is the capacity to have rotation.

Heavy duty construction of the axle and generator is compatible with and takes advantage of the large mass of the semi-tractor/trailer to make electric power. This power from the generator charges batteries and runs the electric refrigeration unit and its electric motor whenever the vehicle is in motion. The combination of battery power and dc electric motor replaces the internal combustion engine typically used to power reefers thus eliminating their exhaust emissions.

In some cases a compressor with a built-in electric motor is used. Stored battery power runs the refrigeration unit electric motor when the vehicle is stationary and remote. Line power is used to charge the batteries and run the electric refrigeration unit during situations where the vehicle is stationary and line power is available.

This all electric reefer system meets idle restriction mandates and emission standards. All components of the power and refrigeration systems can be mounted to a semi-trailer making it self contained and independent of the tractor configuration. The axle and differential are mounted to the normal suspension of the semi-trailer thus assuring this all electric semi-trailer reefer system will meet existing road worthiness laws. This mobile power system can be mounted on a variety of vehicles and used to run many different types of electrical units.

THE INVENTION

Thus, what is disclosed and claimed herein is a battery powered transport refrigeration assembly. The battery powered transport refrigeration assembly comprises in combination a truck axle equipped with at least one wheel at each end. There is centered in the truck axle, a differential, driven by the axles.

There is a drive shaft, the drive shaft having a near end and a distal end, and said drive shaft being operably attached at the near end to the differential. There is an isolation bearing coupler connected to the distal end of the drive shaft, the coupler being attached at the opposite end to a shaft of a generator.

The generator is attached to a mount, and the mount is attached to the underside of a semi-transport trailer. There is a voltage regulator driven by the generator and a first set of electrical leads attached to the voltage regulator. The opposite ends of the first set of electrical leads are attached to a battery.

There is a second set of electrical leads from the battery to a DC motor controller, and a third set of electrical leads from the DC motor controller to a DC motor, the DC motor having a centered drivable shaft. There is an evaporator, the evaporator having a fan mounted in it.

There is also a pulley mounted on the centered drivable shaft and a belt mounted on the pulley, the belt also being mounted on a second pulley, wherein the second pulley is mounted on a shaft that is centered in a fan for the evaporator.

Also included is a compressor, the compressor being driven by the centered drivable shaft of the DC motor.

Finally, there is a delivery line for delivery of a compressible refrigeration gas to the compressor and a return line for return of uncompressed refrigeration gas.

DETAILED DESCRIPTION OF THE DRAWINGS

Figure 1:
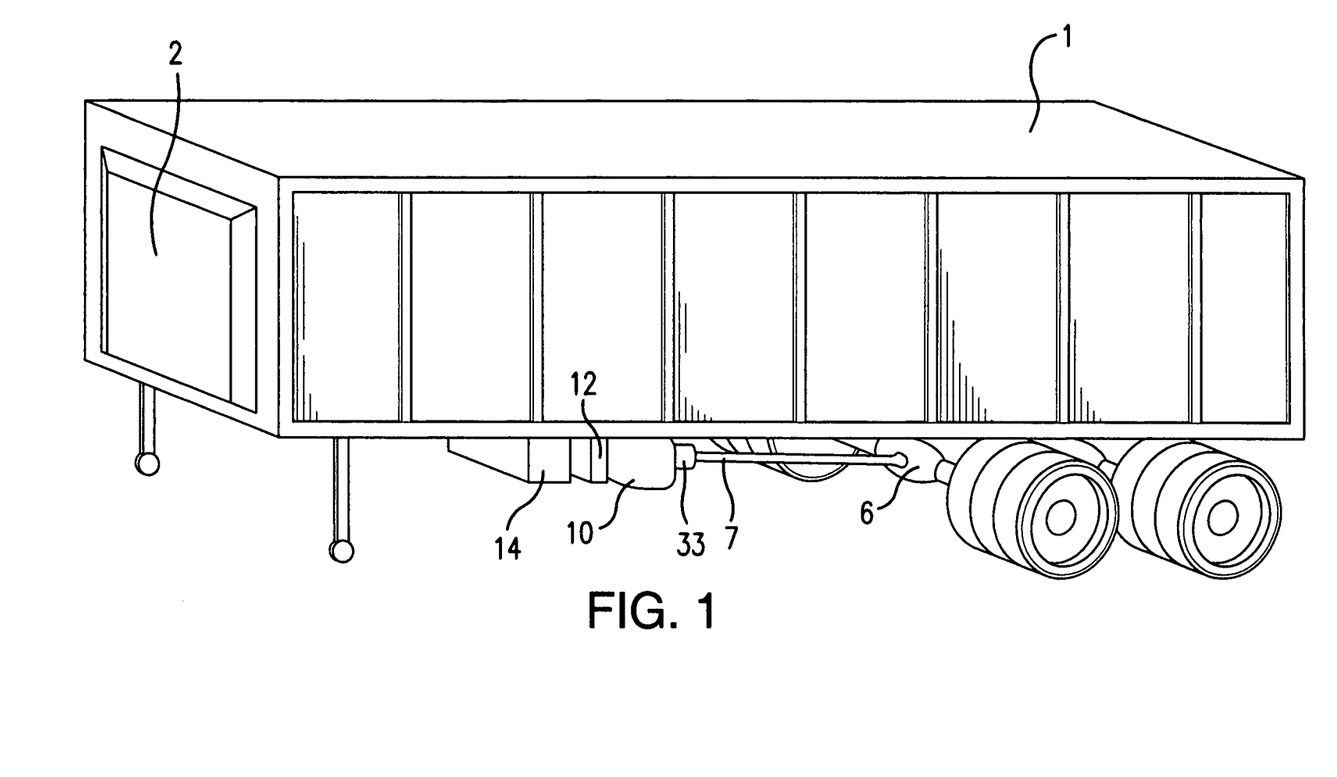
FIG. 1 is an isometric view of the semi-trailer showing the reefer unit, battery and power generating system.
Figure 2:
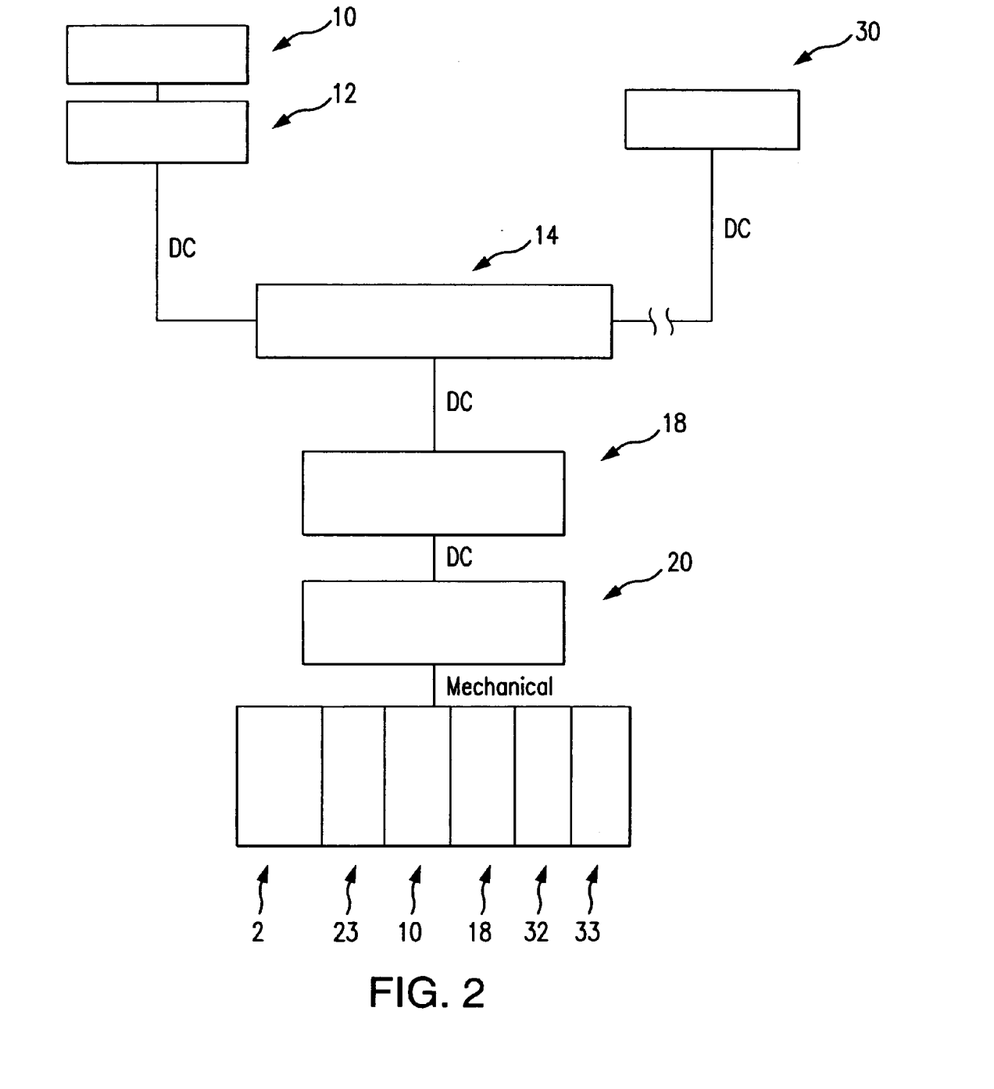
FIG. 2 is a block diagram of the DC power control system.

Turning now to FIG. 1 wherein there is showing a view in perspective of a semi-trailer 1 outfitted as a battery operated refrigerated transport unit.

There is shown a refrigeration unit 2 which will be described in more detail infra, a set of carrier wheels 3 for the trailer 1, a second set of wheels 4 (the non-drive wheels), which are part of the instant invention.

Shown between the non driven wheels 4 is an axle 5, which if bifurcated as in ordinary truck wheels such that there is a set of axes 5 on each side of a differential 6.

The differential 6 is located at a ninety degree angle relative to the axes 5. The differential 6 has attached thereto at a near end 8, a drive shaft 7, which is directed forward, and is attached on the opposite end, or distal end 9 to a generator 10 by an isolation bearing coupling 33. The generator 10 has fixed on its front end 11, a voltage regulator 12.

The voltage regulator 11 has a first set of electrical leads 13 running from the voltage regulator 12 to a battery 14.

Figure 4:
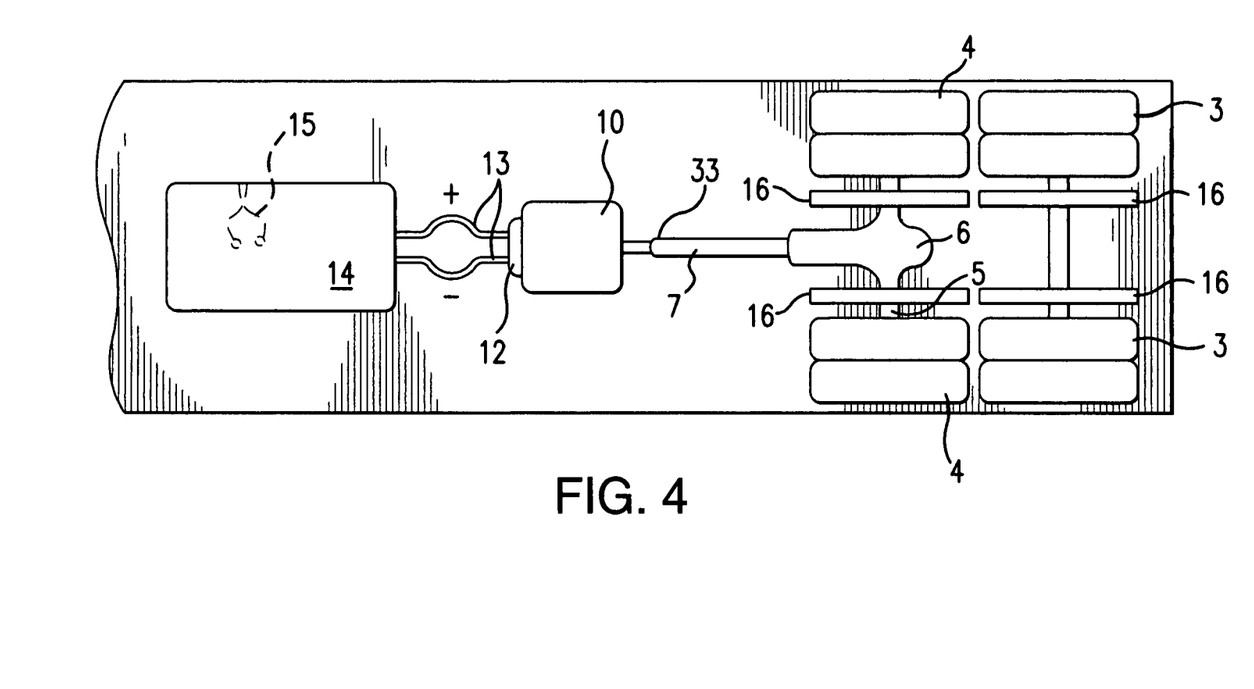
FIG. 4 is an enlarged bottom perspective view of the power generating and storage system part of this invention mounted to the semi-trailer.

FIG. 4 shows this assembly from a bottom view of the trailer 1 wherein there is shown the trailer 1, the carrier wheels 3, suspension systems for the wheels 16, axes 5, differential 6, drive shaft 7, generator 10, voltage regulator 12, first electrical leads 13, the battery 14, and a second set of leads 15 that lead from the battery 14 to the refrigeration unit 2 (the second set of leads 15 is shown in phantom in this Figure), and the generator mount 32.

Figure 3:
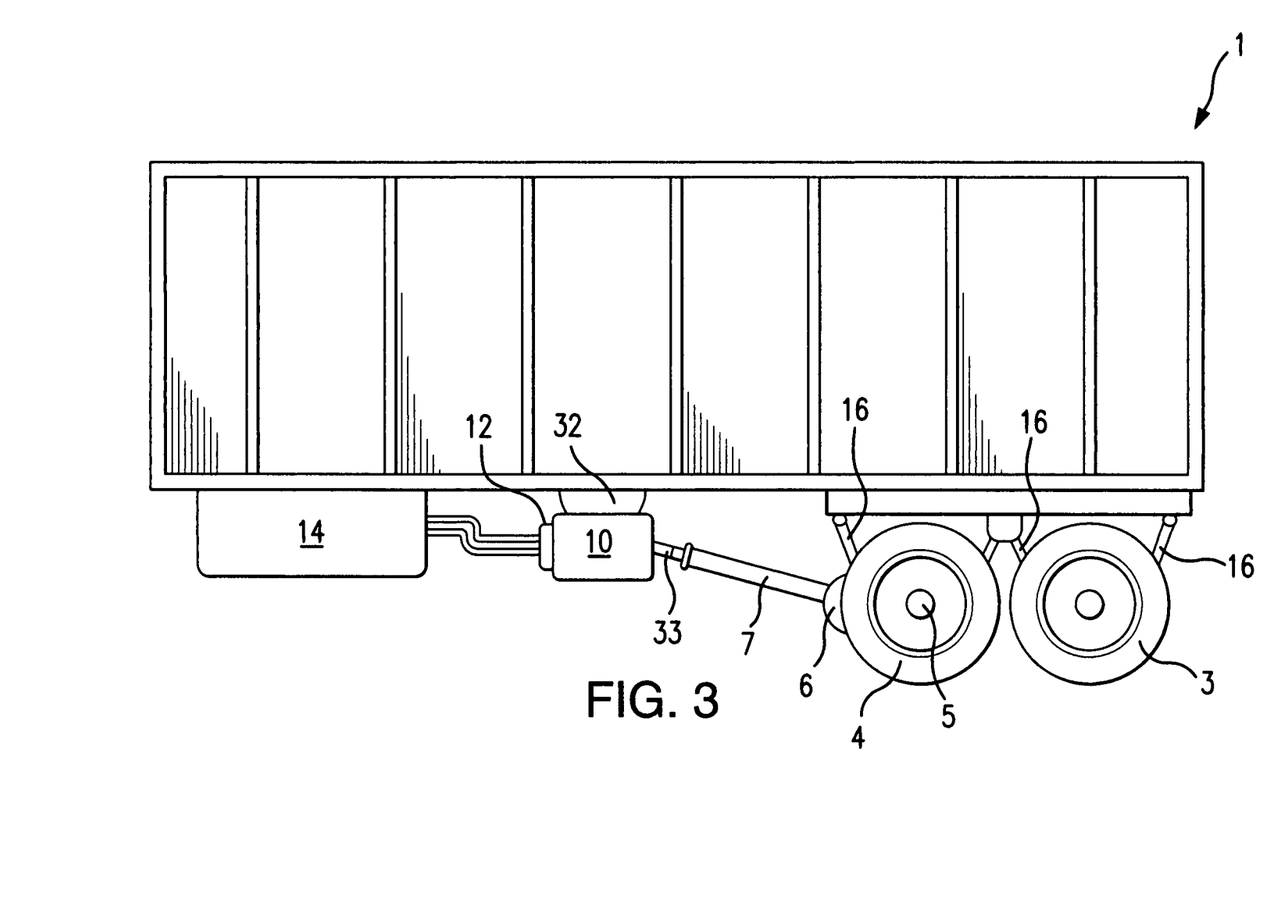
FIG. 3 is a side view of the power generating and storage system mounted to the semi-trailer.

FIG. 3 is a detailed view of the rear portion of the trailer 1 showing the trailer 1, the carrier wheels 3, the suspension system for the wheels 16, one axle 5, the differential 6, the drive shaft 7, the generator 10, the voltage regulator 12, the battery 14, and the first leads 13.

Figure 5:
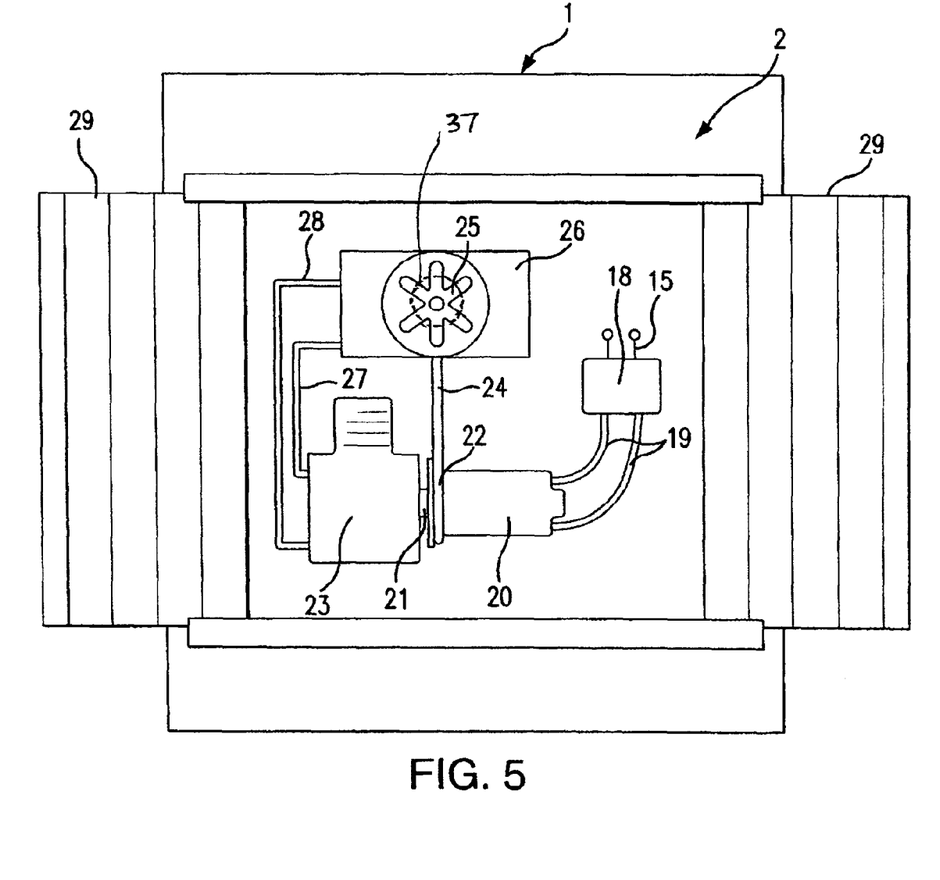
FIG. 5 is an enlarged view of the reefer unit with electric motor and control system.

FIG. 5 is a front detail of the refrigeration unit 2 that is installed in the front 17 of the trailer 1. Shown therein is the DC motor controller 18, the second leads 15 coming from beneath the trailer 1 to attach to the DC motor controller 18, a third set of leads 19 that lead from the DC motor controller 18 to the DC motor 20; a shaft 21 centered in the DC motor 20, and mounted on the shaft 21, a first pulley 22.

The shaft 21 drives the compressor 23. There is a drive belt 24 on the first pulley 22, which also drives a second pulley 37, shown in phantom in FIG. 5, that is attached to a shaft of the fan 25 on the evaporator 26 located just above the compressor 23.

There are delivery lines 27 for the compressed gas and return lines 28 for the uncompressed gas. Components 29 are the doors that normally cover the refrigeration unit 2.

FIG. 3 is a block diagram of the individual components and how they interrelate. The number 30 designates a battery charger and an auxiliary battery. The designation "DC" between the boxes designates the type of electrical charge and the word "mechanical" after the DC motor designates a mechanical connection.

Figure 6:
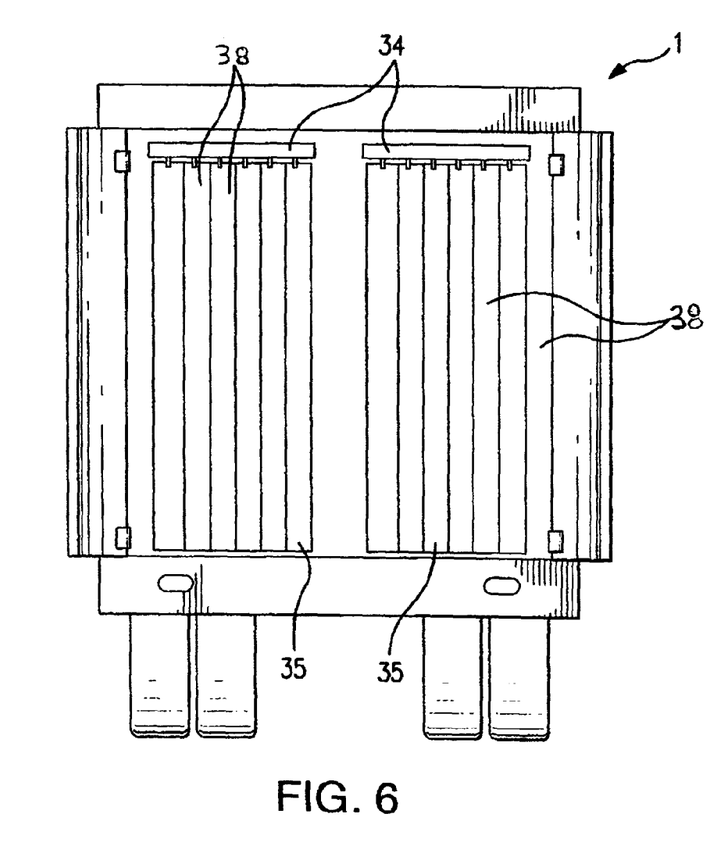
FIG. 6 is a full back view of a semi-trailer of this invention showing containment cooling curtains in place.

FIG. 6 is a full back view of a semi-trailer 1 of this invention showing containment cooling curtains 38 in place. The curtains are mounted on a track 34 for convenience in moving the curtains 38. The bottoms 35 of the curtains 33 are loose and can move by gentle force and then they return to their original position.

Figure 7:
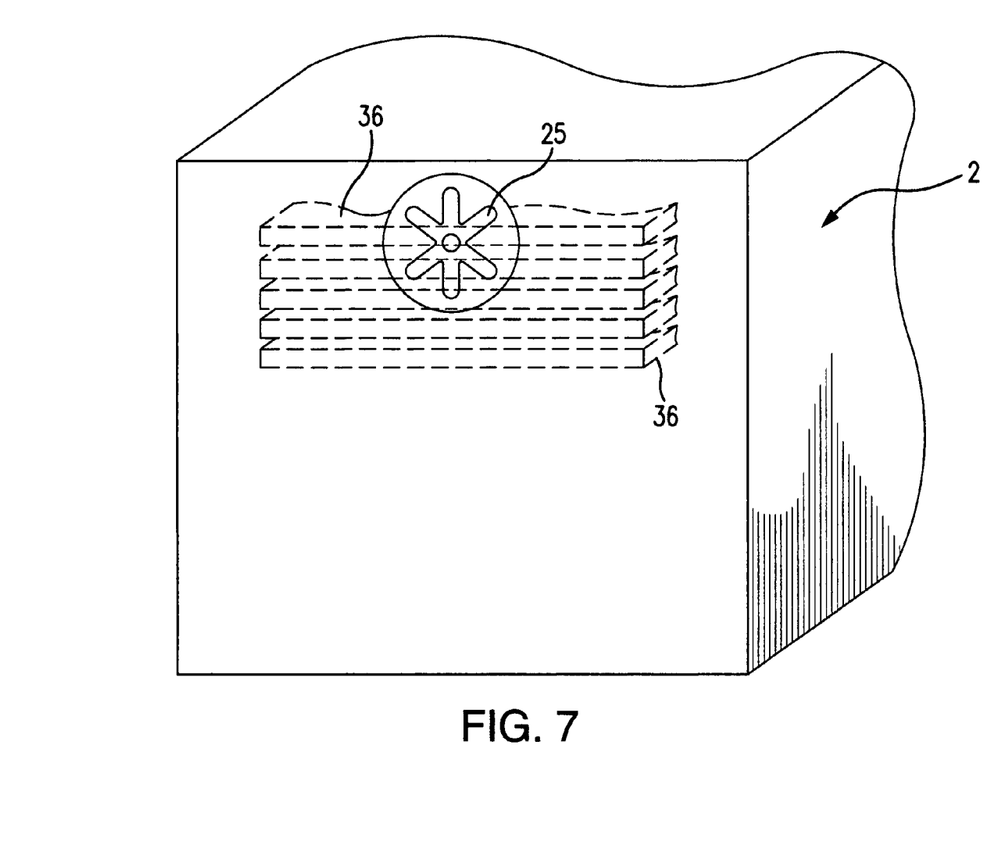
FIG. 7 is a full front view of a eutectic plate array for use in the invention herein.

FIG. 7 is a full front view of a portion of a refrigeration unit 2 of this invention showing eutectic plates 36 for cooling along with a fan 25.

Generally, what is disclosed is a battery powered all electric transport refrigeration un that is tailored for a semi-trailer. A dc electric motor drives the refrigeration compressor. A diesel motor is not used in this system. This clean mobile refrigeration unit and power generating system includes an axle, differential, drive shaft and electricity generator driven by tires and wheels in contact with a roadway or other surface. Regulated power from the generator charges batteries and runs the electric refrigeration unit and its dc electric motor. Stored battery power runs the refrigeration unit and its dc electric motor when the vehicle is stationary and remote. Line power (31) is used to charge the battery when the vehicle is stationary and line power is available. This mobile power system can be mounted on a variety of vehicles and used to run many different types of electrical units.

The method and system used to convert vehicle momentum into electrical power is comprised of wheels attached to an axle and differential turning a drive shaft and generator. The wheels, axle and differential are mounted to the standard suspension of the semi-trailer. Wheel rotation is fed into a differential unit that provides an output rotation at a 90 degree angle to the wheel axis. Differential gears are chosen to optimize rotation speed of the connecting drive shaft. Power is used from the generator to both run the refrigeration unit electric motor and charge storage batteries.

Regulated power from the electricity generator is fed into the battery. The battery powers the dc electric motor through a dc motor controller or line contactor. A generator compatible with the electric motor of the refrigeration unit is used. Batteries are used to run the refrigeration unit when the trailer is stationary or anytime the generator is not producing sufficient power. The batteries are charged via a regulator that controls power from the generator. The regulator sets the voltage and limits the current into the batteries. This stored battery power is sent to the dc motor controller or line contactor and then on to the dc motor that drives the compressor of the refrigeration unit.

Current reefers pollute the air and are noisy because they depend upon diesel engines to provide their electrical needs. This unit, driven by only electricity does not emit carbon based gases and particles and is much quieter.

This semi-trailer specific electric power system makes use of the trailer motion to drive the electricity generator. It is a matter of converting the translational momentum of the vehicle to rotational momentum. Energy conservation is achieved by use of the semi-tractor/trailer momentum. Momentum is the primary driver of the electricity generator with this invention.

This generator does not place an additional load on the engine of the semi-tractor during acceleration from stop. The high power and fuel use part of the semi-tractor/trailer operation. The electric generator does not represent a load on the semi-tractor engine until it starts putting out power at around 25 mph depending on the generator rpm per vehicle mph of the design. The reefer runs off the battery during acceleration from stop and then runs off the generator at higher vehicle speeds when the power generating unit is efficiently using vehicle momentum to provide electric power. The electricity generator may be programmed to not produce electricity during any acceleration phase so it never puts a load on the semi-tractor engine during acceleration of the vehicle. The semi-trailer is but one example of the use of this invention.

What is claimed is:

1. A battery powered transport refrigeration assembly, said battery powered transport refrigeration assembly comprising in combination:
   a truck axle equipped with at least one wheel at each end;
   centered in said truck axle, a differential, driven by said axle; a drive shaft, said drive shaft having
   a near end and a distal end, said drive shaft being operably attached at the near end to the differential;
   an isolation bearing coupling connected to said distal end of the drive shaft, said coupler being attached at a near end of a shaft of a generator;
   said generator being attached to a mount, said mount being attached to the underside of a semi-transport trailer;
   a voltage regulator driven by the generator;
   a first set of electrical leads attached to the voltage regulator and the opposite end of the first set of electrical leads being attached to a battery;
   a second set of electrical leads from the battery to a DC motor controller;
   a third set of electrical leads from the DC motor controller to a DC motor, the motor having a centered drivable shaft;
   an evaporator, said evaporator having a fan mounted therein;
   a pulley mounted on the centered drivable shaft and a belt mounted on the pulley, the belt also being mounted on a second pulley, said second pulley being mounted on a shaft that is centered in a fan for the evaporator;
   a compressor, said compressor being driven by the centered drivable shaft of the DC motor;
   a delivery line for delivery of a compressible refrigeration gas to the compressor;
   a return line for return of uncompressed refrigeration gas.

2. The battery powered transport refrigeration assembly as claimed in claim 1 wherein the axes and wheels are mounted on the underside of a semi-truck trailer using standard truck suspension.

3. The battery powered transport refrigeration assembly as claimed in claim 1 wherein the wheels are mounted such that they align with an adjacent set of carrier wheels.

4. The battery powered transport refrigeration assembly as claimed in claim 1 wherein the generator mount is adjustable.

5. The battery powered transport refrigeration assembly as claimed in claim 4 wherein the adjustability is a sliding assembly.

6. The battery powered transport refrigeration assembly as claimed in claim 4 wherein the adjustability is a track assembly.

7. The battery powered transport refrigeration assembly as claimed in claim 1 wherein the power delivered is 18 Kw or greater.

8. The battery powered transport refrigeration assembly as claimed in claim 1 wherein the refrigeration unit has a battery charger.

9. The battery powered transport refrigeration assembly as claimed in claim 1 wherein there is, in addition, an auxiliary battery.

10. The battery powered transport refrigeration assembly as claimed in claim 1 wherein the generator is controllable to no produce electricity during acceleration of a truck and trailer on which the assembly is mounted.

11. The battery powered transport refrigeration assembly as claimed in claim 1 wherein all of the assembly is contained on or in a semi-trailer.

12. In combination, a truck, a semi-trailer having the assembly as claimed in claim 1 installed on or in the semi-trailer.

13. The assembly as claimed in claim 1 wherein the semi-trailer has, in addition, cold air containment curtains installed.

14. The assembly as claimed in claim 1 wherein the semi-trailer has, in addition, eutectic cooling plates installed therein.

15. The assembly as claimed in claim 1 wherein the electric generator is configured to produce dc power over a broad rpm range.

\* \* \* \* \*